March 14, 1933.  B. P. JOHNSON  1,901,301
COMBINED GRAIN AND FERTILIZER DISTRIBUTOR
Filed Feb. 8, 1932    2 Sheets-Sheet 1

Inventor
Ben P. Johnson
Attorneys

March 14, 1933.  B. P. JOHNSON  1,901,301
COMBINED GRAIN AND FERTILIZER DISTRIBUTOR
Filed Feb. 8, 1932  2 Sheets-Sheet 2
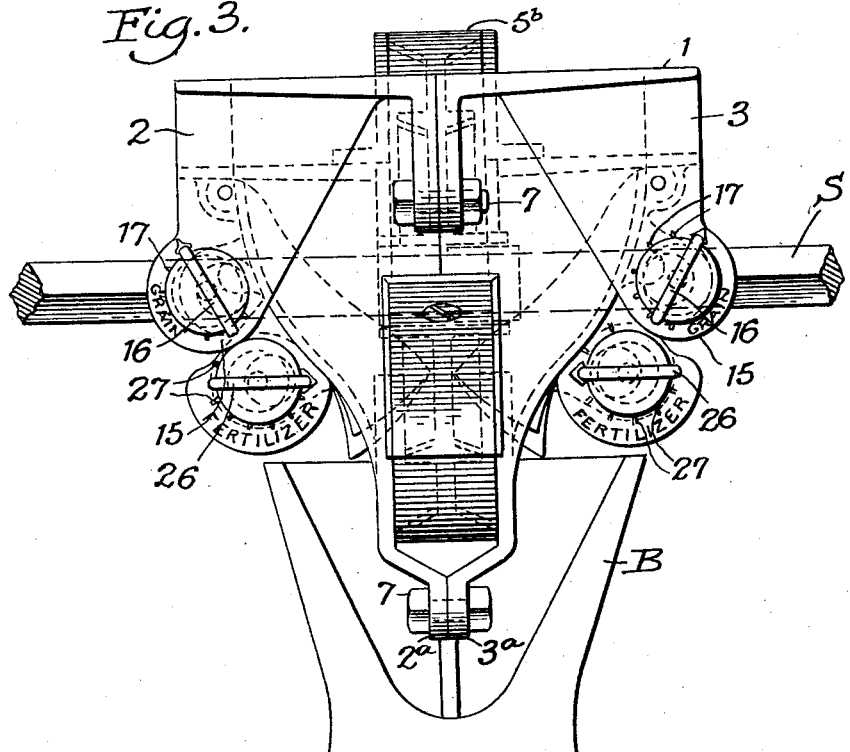
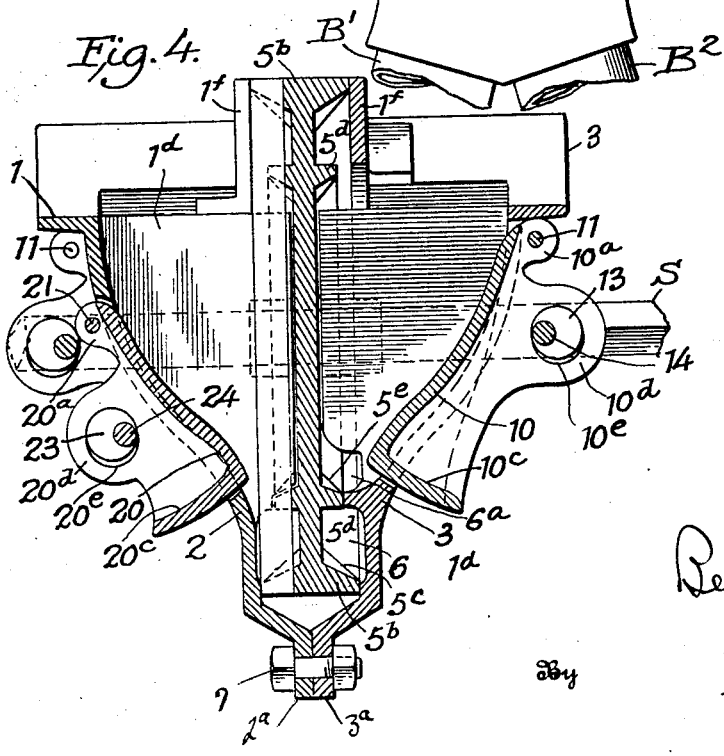

Patented Mar. 14, 1933

1,901,301

UNITED STATES PATENT OFFICE

BEN P. JOHNSON, OF SPRINGFIELD, OHIO, ASSIGNOR TO EDWARD E. GREINER, OF SPRINGFIELD, OHIO

COMBINED GRAIN AND FERTILIZER DISTRIBUTOR

Application filed February 8, 1932. Serial No. 591,727.

This invention relates to distributors for seeding machines such as disclosed in my copending application filed February 6, 1932, Serial No. 591,407, but the principal object of the present invention is to provide novel double-run adjustable throat combined grain and fertilizer distributors, of the force feed type, for attachment to the grain hoppers of such seeding machines, the present application being an improvement upon the distributor shown in my copending application filed February 6, 1932, Serial No. 591,409. In the present invention the hoppers must have a division wall for separating the grain and granular fertilizer, and said distributors have a single rotatable feed wheel dividing the interior of the distributor into separate compartments cooperating with each face of the force feed wheel, to independently feed seed to their respective furrows, also each compartment is provided with a division wall underlying the division plate of the hopper, disposed normal to the web of the wheel adjacent the outer periphery thereof for dividing each compartment into separate grain and fertilizer chambers; with means in each chamber for adjusting its discharge throat to regulate the amount of grain or fertilizer delivered to the feed pipes leading to the opened furrows.

My distributors are particularly adapted for distributing fertilizer in granular or pellet form as required in most Eastern States, and by use of my novel combined grain and fertilizer distributors, I distribute simultaneously the grain and fertilizer in regulated quantities, the grain being in granular or pellet form and previously screened to substantially the same size as the grain. By means of the adjustable throat feature I require no separate driving device to regulate the various quantities of grain and fertilizer discharged.

A further object of the invention is to provide novel grain and fertilizer distributors of the above type with novel independently adjustable throats for regulating the amounts of seed and fertilizer fed to the respective furrows by each side face of the rotatable feed wheel, with means on the outer side of the distributor casing for adjusting and maintaining the throats in adjusted positions.

A still further object of the invention is to provide an indicator pointer and dial to insure accuracy in setting each independently adjustable throat to feed the same amount of grain and fertilizer.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:—

Fig. 3 is a front elevation thereof.

Fig. 4 is a section on the line 4—4, Fig. 1.

Figure 1:
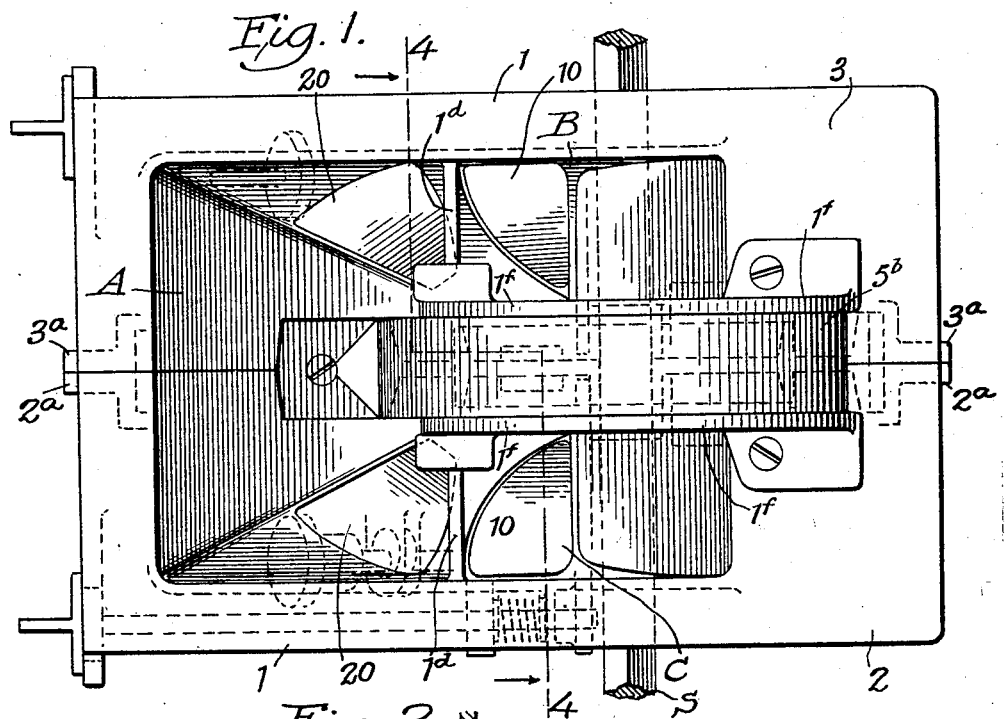
Fig. 1 is a top plan view of the distributor, detached.

As shown, my novel distributor preferably comprises a casing adapted to be mounted across an opening H', preferably of general rectangular shape, in the bottom of the feed hopper H, said casing having a flange 1 at its upper end conforming with the curvature of the bottom of hopper H and with the shape of opening H'. Preferably the casing is made in two complemental and symmetrical halves 2 and 3 bolted together on the centerline of the casing. In each half 2 and 3 of the casing is a bearing 4 adapted to receive hub 5a of the force feed wheel 5 disposed on the centerline of the casing and dividing the interior of the casing into separated compartments disposed at each side of the wheel, the compartments being open at the top, and the walls thereof extending down the web of wheel 5, on one side of the hub bearing 4, and below and around the bearing 4 and partly up the wheel 5 at the other side of the bearing, in the usual manner, to the point of discharge 6 (Fig. 2), the walls of each compartment gradually contracting towards the point of discharge adjacent the lower periphery of wheel 5. The wheel 5 is preferably provided with a peripheral flange $5b$ having teeth $5c$ (Fig. 1), formed on its inner face, at each side of the web, for assisting in forcibly feeding the fertilizer through the compartments as the wheel 5 is rotated by the drive shaft S in the direction shown by the arrow in Fig. 2, said shaft S passing through the hub $5a$. The flange $5b$ of the wheel 5 is preferably flush with the lower periphery of the casing sections 2 and 3, as shown, and forms part of the outer wall of the casing, each section 2 and 3 being provided with lugs $2a$, $3a$, which meet across the flange of the wheel 5, the lugs being transfixed by bolts 7, and properly spacing the casing sections 2 and 3 with respect to wheel 5.

The web of wheel 5, on each side is also provided with opposed annular flanges $5d$ (Fig. 2) concentric with flange $5b$ and provided with teeth $5e$ similarly to flange $5b$; and a division wall $1d$ is formed in each casing section 2 and 3 conforming with the lower periphery of flange $5d$ from the point of discharge 6 up on the point of vertical tangency to the flange $5d$, from whence the wall $1d$ passes vertically upwardly to the upper end of the casing and cooperates with the division plate $H^2$ (Fig. 2) of the hopper H. The space above the flange 1 of the casing between the flanges $5b$ and $5d$ of the wheel 5 is closed on each side by a guard $1f$ (Fig. 4), whereby the interior of the casing is divided into three separate compartments A, B and C (Fig. 1). The compartments B and C being disposed at opposite sides of the web of wheel 5 and to the right (Fig. 1) of the division wall $1d$, and the walls of the compartments B and C curving around the periphery of the flange $5d$ of the wheel and contracting to the discharge point $6a$ (Fig. 2) above the flange $5d$; while compartment A extends entirely across the width of the casing to the left of division wall $1d$ (Fig. 1) and narrows down to a throat between the flanges $5b$ and $5d$ of wheel 5, the point of discharge being at 6 (Fig. 2) at each side of the wheel 5.

Hence it will be seen that at each side of wheel 5 the seeds from compartments B and C are discharged at $6a$ directly above the discharge point 6 for the fertilizer from compartment A, the single wheel 5 forcibly feeding the fertilizer and seeds through the compartments A, B, C, which compartments however are non-communicating by reason of the flanges $5b$, $5d$ of the wheel, the guard $1f$, and the division walls $1d$. The grain or fertilizer at each side of the wheel 5 may fall together into a divided throat B (Fig. 3) having separate distributing pipes B' and $B^2$ discharging behind their individual opened furrows.

Preferably a deflector $6d$ (Figs. 2 and 6) is provided at the point of discharge $6a$ for the seed compartments B and C at each side of the wheel 5 for preventing the discharged seed from falling from the upper flange $5d$ upon the lower flange $5d$ at the point of discharge $6a$.

Figure 2:
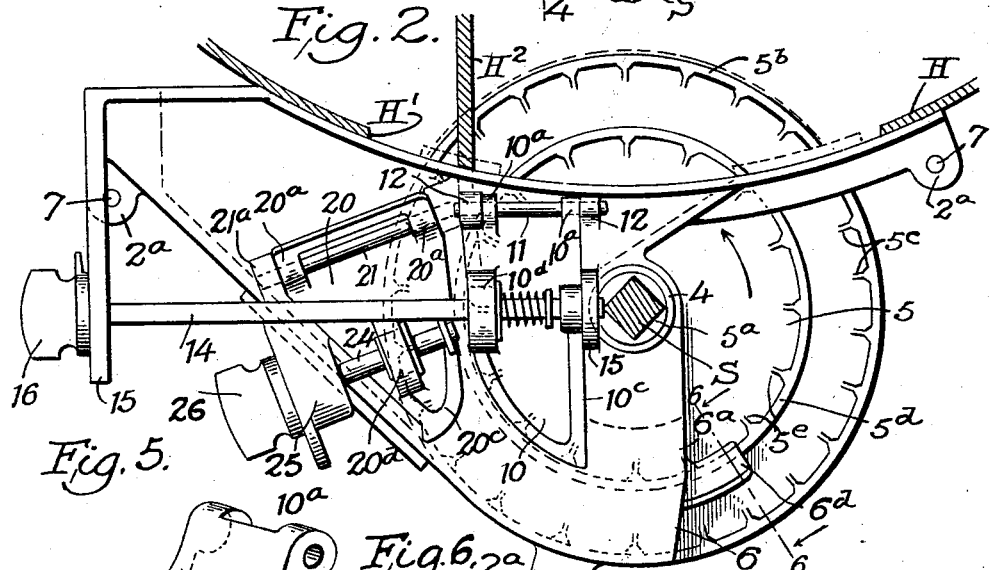
Fig. 2 is a side elevation showing my distributor secured to the bottom of a seed hopper, the hopper being shown in section.
Figures 5, 6:
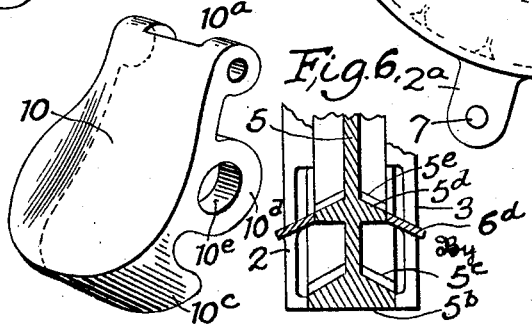
Fig. 5 is a perspective view of one of the gates, detached.
Fig. 6 is a section on the line 6—6, Fig. 2.

In the outer wall of each seed compartment B and C as shown in Figs. 1, 2 and 4 is an adjustable throat such as shown in my copending application filed February 6, 1932, Serial No. 591,409, each throat comprising a gate 10 (Fig. 5) disposed in an opening therefor, each gate 10 forming part of the exterior wall of its compartment, and being hinged at its upper end to the casing section by means of a pin 11 passing through perforated lugs $10a$ on the gate and lugs 12 on the casing as indicated in Figs. 2, 4 and 5. Each gate 10 curves inwardly and downwardly to engage the web of wheel 5 adjacent its lower periphery above the flange $5d$, whereby as the gate is swung towards the web of the wheel 5, the throat of the seed compartment will be narrowed to restrict the amount of seed passing to the point of discharge $6a$, and whereby as the gate is swung away from the web of wheel 5, the throat will be enlarged to permit a greater amount of seed to pass to the point of discharge $6a$. At the lower end of each gate 10, on its rear face, is a flange $10c$ making a close fit within the sides of the opening in the wall of the casing, to prevent seed from escaping from the compartment around the sides of the gate in any position of adjustment of the gate.

On the rear face of each gate 10 is an outwardly projecting lug $10d$ having an elongated slot $10e$ (Fig. 5) adapted to receive an eccentric cam 13 mounted upon a shaft 14 journaled in perforated lugs 15 on the sides of the casing sections, said shaft 14 being rotatable by a knob 16 at the front end of the casing whereby as the shaft 14 is rotated the gate 10 will be swung towards or away from the web of the wheel 5.

On the front face of the casing, as shown in Fig. 2, are indicating indicia 17 (Fig. 3) cooperating with a pointer on the knob 16 whereby the knob 16 may be readily set to accurately feed the required amount of seed from the compartment at each side of the wheel 5, the gates 10 being independently adjustable by the use of the separate knobs 16, and the seeds falling into a throat B (Fig. 3) having a division plate below the centerline of the wheel 5, to divide the throat B into two compartments feeding seed from the respective compartments through branches B' and $B^2$ to their respective seed furrows.

Similarly in each side wall of the compartment A, at opposite sides of wheel 5, and terminating at a point between the flanges 5b and 5d, is an adjustable throat substantially similar to the throats for the compartments B and C above described, each comprising a gate 20 disposed in an opening therefor in the side wall of the compartment and forming a part of the exterior wall of compartment A. Each gate 20 is hinged to the side wall of the casing by means of a pin 21 passing through perforated lugs 20a on the gate and lugs 21a on the casing as shown in Fig. 2, the gate 20 curving inwardly and downwardly and adapted to engage the web of the wheel 5 between the flanges 5b and 5d whereby as the gate 20 is swung towards the wheel 5 the throat of the fertilizer compartment will be narrowed to restrict the amount of granular fertilizer passing to the point of discharge 6, and whereby when the gate 20 is swung away from the wheel the throat will be enlarged to permit a greater amount of fertilizer to pass to the point of discharge. At the lower end of each gate 20 on its rear face is a flange 20c making a close fit within the sides of the opening in the wall of the casing to prevent fertilizer from escaping from the compartment A around the sides of the gate 20 in any adjusted position of the gate. On the rear face of each gate 20 is an outwardly projecting lug 20d having an elongated slot 20e adapted to receive an eccentric cam 23 mounted upon a shaft 24 journaled in perforated lugs 25 on the side of the casing section adjacent the gate, said shaft 24 being rotatable by a knob 26 at the front end of the casing whereby as the shaft 24 is rotated the gate 20 will be swung towards or away from the web of wheel 5. On the front face of the casing as indicated in Fig. 3 are indicia 27 cooperating with a pointer on the knob 26 whereby the knobs may be readily set to accurately feed the required amount of granular fertilizer from the compartment A at each side of the wheel.

By the above construction the throats in compartments A, B and C are readily and separably adjustable, and on each side of the wheel the seeds and granular fertilizer are fed simultaneously in regulated quantities, the same dropping into the divided throat B and from thence distributed by pipes B' and B² behind the respective opened furrows.

The amount of seed and powdered fertilizer distributed by each side of the wheel may be readily and accurately adjusted by regulating the knobs 16 and 26 which operate the respective throat gates 10 and 20.

I claim:

1. In a combined grain and fertilizer distributor, a casing; a force-feed wheel rotatably mounted in the casing; separate grain and fertilizer compartments cooperating with the web of the wheel and contracting towards their points of discharge; an adjustable throat in each compartment forming part of the wall thereof and adjustable towards and away from the web of the wheel to regulate the amount of material passing through each compartment; and means for adjusting each throat.

2. In a distributor as set forth in claim 1, each throat comprising a gate fitting an opening in the wall of the compartment and hingedly connected to the casing; said gate having a rearwardly extending peripheral flange engaging the sides of the opening to prevent material from passing out of the opening in any adjusted position of the gate.

3. In a distributor as set forth in claim 1, each adjusting means comprising a shaft journaled in lugs adjacent the throat and having a cam thereon; means on the gate cooperating with the cam, a knob on the shaft for rotating the same; and indicia on the casing cooperating with the knob for indicating the setting of the throat.

4. In a grain distributor, a casing; a force-feed wheel rotatably mounted therein; division walls dividing the casing into separate grain and fertilizer compartments at each side of the wheel; the walls of each compartment narrowing in width towards their points of discharge; an adjustable throat in each compartment forming part of the wall thereof and adjustable towards and away from the web of the wheel to regulate the amount of material passing through each compartment; and means for adjusting each throat.

5. In a distributor as set forth in claim 4, each throat comprising a gate fitting an opening in the wall of the compartment and hingedly connected at its upper end of the casing; each gate having a rearwardly extending peripheral flange slidably engaging the sides of the opening to prevent material from passing out of the opening in any adjusted position of the gate.

6. In a distributor as set forth in claim 4, each adjusting means comprising a shaft journaled in lugs at the sides of each opening, said shaft having a cam thereon; a lug on each gate embracing the cam, a knob on the shaft at the front of the casing for rotating the shaft; and indicia on the casing cooperating with the knob for indicating the setting of the throat.

7. In a grain distributor, a casing; a force-feed wheel having inner and outer flanges rotatably mounted in the casing; division walls opposite the inner flange dividing the casing at each side of the wheel into separate grain and fertilizer compartments; said compartments conforming with the periphery of the flanges and narrowing in width towards the points of discharge; an adjustable throat in each compartment forming part of the wall thereof and adjustable towards and away from the wheel to regulate the amount of grain or fertilizer fed through each compartment; and means for setting each throat.

8. In a distributor as set forth in claim 7, each throat comprising a gate fitting an opening in the wall of the compartment opposite the web of the wheel and hingedly connected at its upper end to the casing; and each gate having a rearwardly extending peripheral flange slidably engaging the sides of the opening for preventing material from passing through the opening in any adjusted position of the gate.

9. In a grain distributor as set forth in claim 7, said adjusting means comprising a shaft journaled in lugs at the sides of each throat and having an eccentric cam thereon; a lug on each gate having an elongated bore receiving the cam, a knob on each shaft at the front of the casing; and indicia on the front of the casing cooperating with the knob for indicating the setting of the throat.

10. In a distributor as set forth in claim 7, the points of discharge of the compartments at each side of the wheel being disposed one above the other, and a deflector plate cooperating with the uppermost point of discharge for the purpose specified.

BEN P. JOHNSON.